United States Patent [19]

Solow

[11] 4,002,216

[45] Jan. 11, 1977

[54] PORTABLE SCALE

[76] Inventor: Benjamin Solow, 5743 Rhodes Ave., North Hollywood, Calif. 91607

[22] Filed: Sept. 24, 1975

[21] Appl. No.: 616,495

[52] U.S. Cl. .............................. 177/208; 177/126; 177/254

[51] Int. Cl.² ................... G01G 5/04; G01G 21/00

[58] Field of Search .......... 177/126, 208, 209, 254

[56] References Cited

UNITED STATES PATENTS

| | | | |
|---|---|---|---|
| 3,261,203 | 7/1966 | Young | 177/208 X |
| 3,378,090 | 4/1968 | Christie | 177/208 X |
| 3,433,316 | 3/1969 | Newman | 177/208 |

*Primary Examiner*—George H. Miller, Jr.
*Attorney, Agent, or Firm*—Allan M. Shapiro

[57] ABSTRACT

Portable scale comprises a platform supported by an air bag with the air bag connected to a pressure-reading device calibrated in weight so that, when a load is placed on the platform, the pressure-reading device indicates its weight. In the preferred embodiment, the air bag is collapsible to occupy little storage space and the indicating device is a bellows constrained by tension spring so that, as pressure increases in the bellows, the lower gage plate moves down the calibrated tape to indicate the weight load.

13 Claims, 9 Drawing Figures

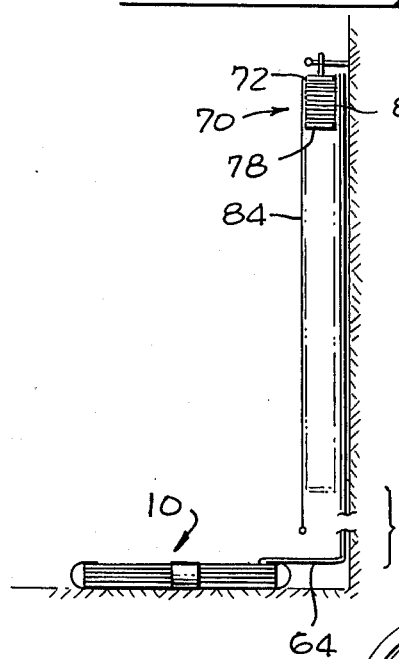
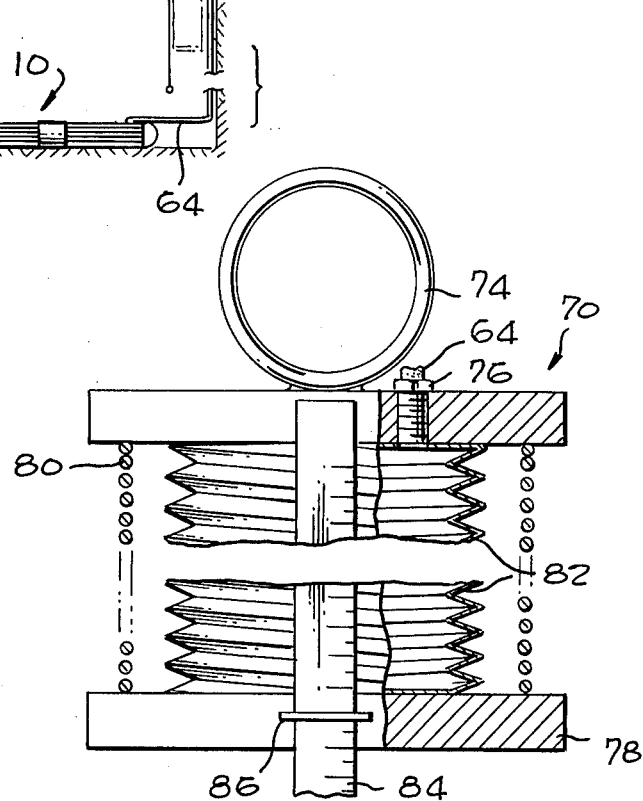
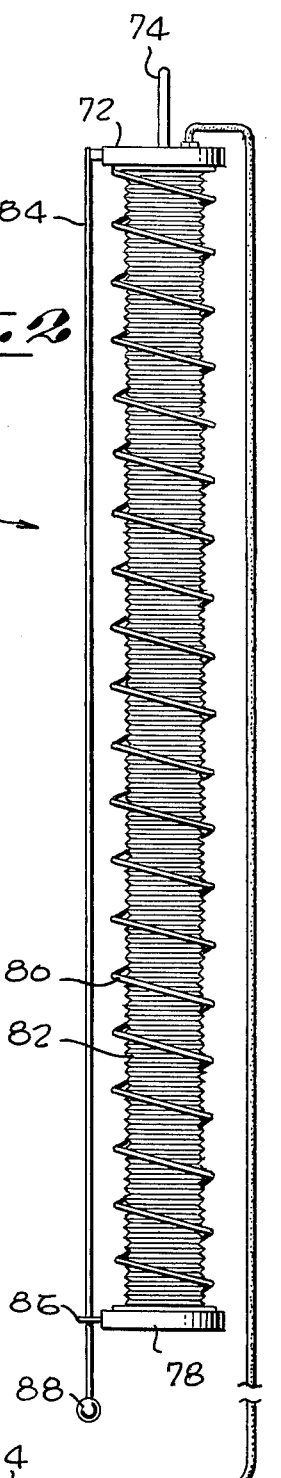
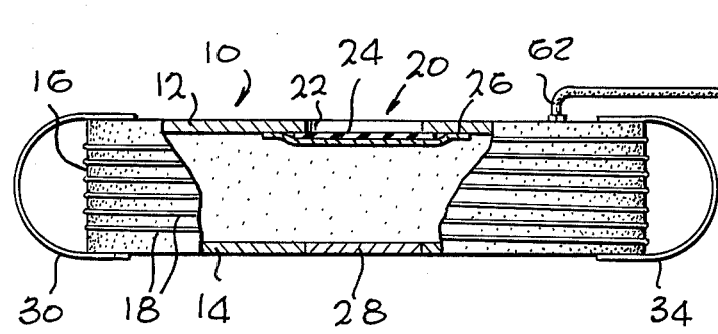

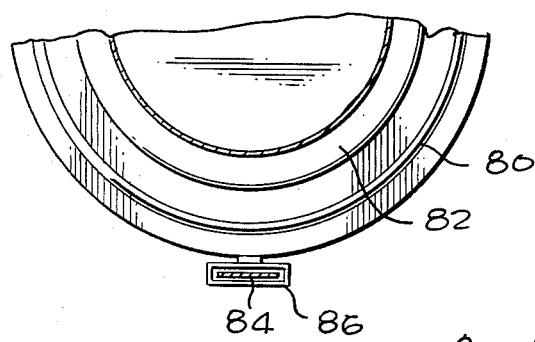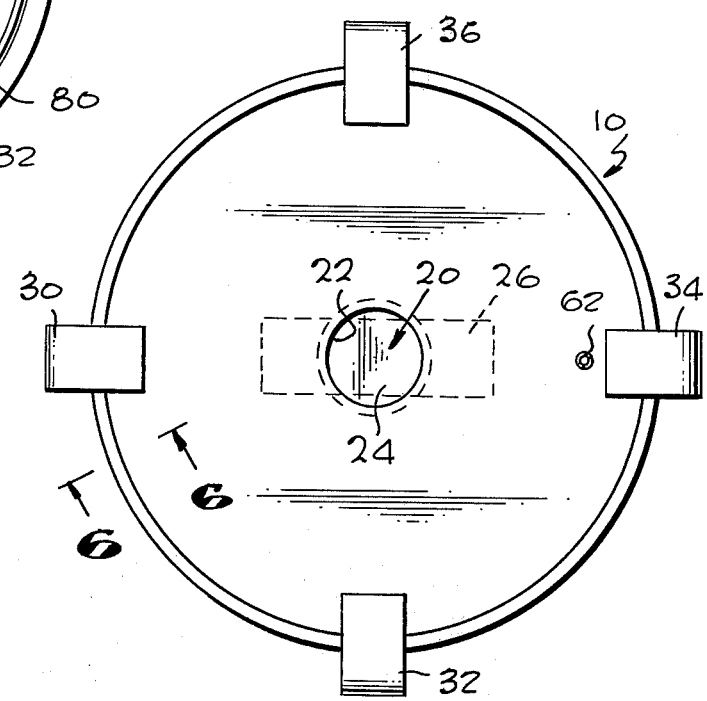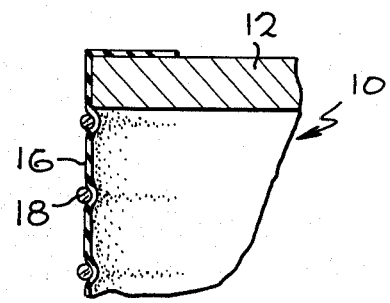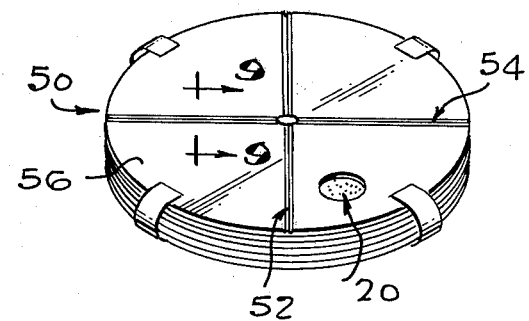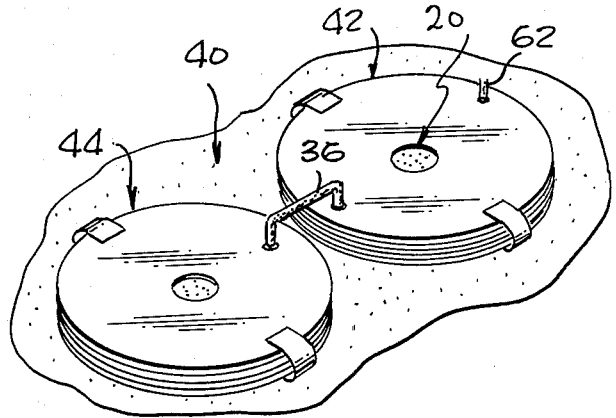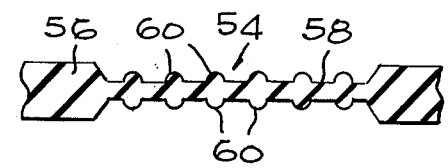

PORTABLE SCALE

BACKGROUND OF THE INVENTION

1. Field of the Invention

This invention is directed to a portable scale particularly adapted for the weighing of persons and particularly adapted for ease of transportation by virtue of its compact size and light weight when not in use.

2. Description of the Prior Art

In affluent societies, man has been concerned with his weight because overindulgence in food can cause overweight together with the problems associated with overweight. Consequently, the need for weight measurement has been recognized. Many different types of weighing scales have been proposed and sold on the market. In quantity, the largest number of scales sold falls into the "bathroom scale" variety where weight causes spring deflection, and the deflection also moves an indicator. This kind of construction is inexpensive and fairly trouble-free so that such scales can be made fairly widely available. When more accuracy is required, beam-balancing scales are used where a scale weight is moved out on balancing beams.

The prior art also includes a number of different kinds of scales which employ hydraulic liquid as the medium interconnecting a movable plunger and the indicator. In this type of structure, the liquid is usually employed as a displacement measuring material to indicate the amount of motion of the platform against a resilient resistance so that the liquid simply serves as an interconnecting displacement signal. One air-filled device (Newman patent, U.S. Pat. No. 3,433,316) is such a device where the air pressure does not serve as resistance to weight, but merely indicates the amount of deflection of the platform on weight-supporting springs.

Additionally, the structures of the prior art are quite complicated because they have equipment which maintin the level character of the platform.

The present invention includes the concept that a light, portable scale can be produced without the need for a structure to maintain the platform parallel to the supporting base and that reading accuracy can be achieved by a properly designed platform, air bag, and pressure-reading device calibrated in weight units.

SUMMARY OF THE INVENTION

In order to aid in the understanding of this invention, it can be stated in essentially summary form that it is directed to a portable scale which has a platform supported only by an air bag with a weight-calibrated, pressure-measuring device connected to the air bag to indicate the weight on the platform.

It is thus an object of this invention to provide a portable weight-measuring scale. It is a further object to provide a portable scale which is economically constructed by having a platform which is supported by an air bag and without the usual structure which attempts to maintain the platform parallel to the base. It is a further object to provide a portable weight-measuring scale which measures the pressure in the air bag and reads out the pressure as weight units. It is yet another object to provide a readout device which is in the form of a tension spring associated with a bellows which expands with pressure and with a device calibrated in weight indicating the amount of expansion due to pressure with both the air bag and the bellows being arranged so that air can be expelled therefrom for compact portability of the scale. It is yet another object to provide a folding platform over an air bag so that platform can be reduced in size for convenient portability.

BRIEF DESCRIPTION OF THE DRAWINGS

The features of the present invention which are believed to be novel are set forth with particularity in the appended claims. The present invention, both as to its organization and manner of operation, together with further objects and advantages thereof, may be best understood by reference to the following description, taken in conjunction with the accompanying drawings in which:

FIG. 1 is a side elevational view of the preferred embodiment of the portable scale of this invention;

FIG. 2 is an enlarged side elevational view thereof, with parts broken away and parts taken in section, showing the weight indicator extended as with a weight on the scale platform;

FIG. 3 is a further enlarged side elevational view of the weight indicator, shown in the closed position;

FIG. 4 is a downward-looking section through the lower part of the weight indicator of FIG. 3;

FIG. 5 is a plan view of the preferred embodiment of the scale platform;

FIG. 6 is an enlarged section, with parts broken away, taken generally along the line 6—6 of FIG. 5;

FIG. 7 is a perspective view of another embodiment of the platform structure;

FIG. 8 is a perspective view of still another embodiment of the platform structure, this structure being particularly arranged for folding into a small configuration; and FIG. 9 is an enlarged section taken generally along the line 9—9 of FIG. 8, with parts broken away.

DESCRIPTION OF THE PREFERRED EMBODIMENT

The portable scale is comprised of a platform which develops pressure in an air chamber therein in proportion to the weight on the platform and a pressure-measuring device which measures the air pressure and indicates the weight on the platform, preferably in weight units. In the preferred embodiment of FIGS. 1 through 6, platform 10 is comprised of an upper board 12 and a lower board 14, see FIG. 2. Flexible, air-impervious skirt 16 interconnects the two boards and is secured thereto. In FIG. 6, skirt 16 extends up past the edges of upper board 12 and is secured down to the top of board 12 and is secured to the top thereto, as by adhesives. This skirt is secured in an airtight manner all around the edge of upper board 12 and similarly all around the edge of lower board 14 to form an air bag which contains the platform pneumatic volume. It is seen that, when air is present between the boards and a downward load is applied to the top board, the air pressure increases proportionally to a load. In order to prevent bulging of skirt 16 from putting vertical loads on upper board 12 to reduce the accuracy of the scale, bulging of the skirt is minimized by wrapped filament 18 which extends around the skirt and constrains it to approximately the diameter of the round boards of the platform. The wrapped filament may be a metal spring wire (such as steel), or may be of polymer composition (such as Mylar), or may be a bundle of fibreglass strands. In each of the cases, the filament may be adhesively attached to the outer wall of the skirt.

Upper board 12 has valve 20 therein. Valve 20 comprises opening 22 below which is positioned valve disc 24 which is resiliently held in place by leafspring 26. Valve 20 permits the entrance and exit of air to and from the interior of platform 10. Lower board 14 may have a plugged opening 28 to aid in assembly.

Leafsprings 30, 32, 34 and 36 are each secured with opposite ends to the upper and lower boards 12 and 14. The leafsprings are naturally straight when unflexed so that this bending of the leafsprings stresses the springs. The stress is in the direction to raise the upper board 12 away from the lower board 14 to cause separation therebetween. Each of the leafsprings is of thin, resilient material such as metal or polymer composition material so that the boards can be pressed together for compact storage when valve disc 24 is moved away from its opening. On the other hand, the leafsprings are such that, when the upper board is not pressed down and the valve is open, the springs are sufficiently strong to raise the upper board to draw air through the opened valve to expand the platform to usable position. Thus, the leafsprings serve as counterbalance to the weight of the upper board. A further function of the leafsprings is to provide some lateral stability of the upper board with respect to the lower board when the platform is in the expanded, to-be-used position. If neither of these functions is desired, the leafsprings can be dispensed with because air can be introduced into the platform by holding open valve 20 and holding the upper board up so that the lower board can gravitationally descend drawing air through the open valve until the platform is fully expanded. Thus, the platform can be expanded for use and compressed for storage in a convenient way. For the platform structure 10 shown in FIGS. 1, 2, 5 and 6, the lateral storage space required is the diameter of the platform which is the diameter of the boards plus the lateral extension of the springs. While the thickness is quite thin in the storage position, the width of storage is quite large.

FIG. 7 illustrates an alternative platform structure 40 which is comprised of individual platforms 42 and 44, each having upper and lower boards and each having a skirt-carrying, wrapped filament. Both are shown as having a valve because it is more convenient to provide identical structures, but only one need have a valve because the air chambers within the platforms are connected by platform-connecting tube 36 which is of flexible construction. For functional purposes the total area of the platforms 42 and 44 should be about equal to the area of platform 10, and thus some lateral storage space area is saved; however when in the storage position, the two platforms 42 and 44 are placed one over the other so that there is a greater storage thickness. As seen in FIG. 7, only two leafsprings are needed on each of the platforms to achieve the weight-balancing and platform-opening functions.

FIGS. 8 and 9 illustrate platform 50 which is very nearly identical to the platform 10. Platform 50 has upper and lower boards with the filament-wrapped skirt connected around the periphery of the platforms. A valve is provided as well as a connection port. The principal difference in structure between the platform 10 and platform 50 is that platform 50 has thin, ribbed fold lines 52 and 54 thereacross. As is better seen in FIG. 9, upper board 56 is of substantial thickness over most of its area, the same as upper board 12, but the fold lines are webs of thinner material, as web 58 for fold line 54. This permits folding along the fold line; however in order to give some strength to the webs in the direction crosswise to the direction of folding, ribs 60 are formed along the fold line. The material of the upper board is preferably of somewhat resilient, synthetic polymer composition material of such composition and character that the folding function can be achieved. The fold lines are sufficiently wide so that, after folding on one of the lines is done, a second folding on the other line can also be done to reduce the lateral storage area required for storage of platform 50.

When there is air in the platform and a person desiring to know his weight stands on the platform, the pressure in the platform rises in order to pneumatically balance his weight. The pressure of the chamber in the platform multiplied by the effective area of the platform expresses the weight of the person. The area of the platform is the area of upper board 12. The bulging of skirt 16 does not affect the area or the pressure but, if unrestrained bulging would be permitted, then the tension forces on the bulging skirt would work on the platform board to apply forces thereto which would cause measuring inaccuracies. Thus, the use of a filament-wound skirt provides a structure which does not apply vertical forces from the skirt onto the platform board when a load is applied. The use of a filament-wound skirt thus aids in improving accuracy. In each case, the interior of the chamber is connected to a connection port 62 to which pressure tube 64 is connected. A preferred diameter of the circular platforms 10 and 50 is 9.5 inches. With a 300 pound full-scale load on the platform, the pressure within the platform is 4.23 psi. Platform structure 40 can be of the same net area to result in the same proportionality.

It can be readily seen that, with such low pressure in pressure tube 64, the device for reading the pressure and converting it to weight must be accurate and must have a long scale length for the low pressure for accurate reading. An ordinary Bourdon tube pressure gage of requisite scale length and sensitivity would be large and heavy and inappropriate for a portable scale. Other common pressure to displacement transducers have the same problems. Thus, readout gage 70 shown in FIGS. 1, 2 and 3 is the preferred embodiment of a pressure to weight transducer. Gage 70 has an upper gage plate 72 which has a folding ring 74 at the top center thereof for support of the gage on a wall hook or on the finger of the user. Connector 76 has pressure tube 64 connected thereon. The connection may be permanent or may be a disconnectable slip fit for convenience in storage. Lower gage plate 78 is supported from the upper gage plate by tension spring 80 which provides distance versus force proportionality. Tension spring 80 is preferably about 18 turns of 0.041 inch music wire to have a shut height of 0.8 inch and deflection per turn for 1.9 pound load of 0.52 inch.

Interiorly of tension spring 80 is bellows 82 which is formed as a long tube of thin, airtight membrane (such as polymer coated cloth of synthetic polymer composition sheet material). Cemented exteriorly to the tube is a 0.1 inch pitch 100 turn spiral filament winding of 0.008 inch polymer or flexible metal wire filament to form the bellows. The bellows area is preferably 0.44 square inch so that, at 4.23 psi, the force on the lower gage platform 78 is 1.9 pounds to represent the full-scale reading of 300 pound load on the platform. Bellows 82 is secured to both the upper and lower gage plates to thus expand proportionately as load is applied to the platforms when the upper gage plate is hung from an appropriate support so that the lower gage plate 78 descends a distance which is proportional to the weight on the platform.

Reading of this distance can easily be achieved with number tape 84 secured to the upper gage plate operating in conjunction with indicator loop 86 secured to lower gage plate 78 and preferably engaging around tape 84. Number tape 84 is held that taut by weight 88 on its bottom. Number tape 84 is calibrated in pounds or other weight units so that the weight on the platform is read out as pounds or the like on the number tape. Zero adjustment is provided by the adjustability of mounting of the number tape at its top, and proportionality is assured by the linearity of tension spring 80. The filament winding of bellows 82 prevents vertical loading on lower gage plate 74 by unbalanced tension in the skin of the bellows. In this way, a lightweight and portable scale which can be conveniently reduced to very small dimensions for storage, packing, and transportation is achieved. The scale is accurate in use so that, even under the difficult circumstances of portability, a highly accurate instrument is achieved. Furthermore, in view of construction of the instrument, a very accurate portable scale is achieved with enduring weighing accuracy.

This invention having been described in its preferred embodiment, it is clear that it is susceptible to numerous modifications and embodiments within the ability of those skilled in the art and without the exercise of the inventive faculty. Accordingly, the scope of this invention is defined by the scope of the following claims.

What is claimed is:

1. A portable weight-measuring scale comprising:
a pneumatic platform having an upper board, a lower board and with a peripheral skirt therearound and attached to both said upper board and said lower board to defined a platform pneumatic volume of substantially constant area, said upper board being free to rock and move in a parallel plane with respect to said lower board so that, when a weight is placed on said upper board, pneumatic pressure in said pneumatic volume is proportional to the weight on said upper board; and
means separate from said platform and connected to said pneumatic volume for measuring the pressure in said pneumatic volume to indicate the weight on the platform.

2. The portable weight-measuring scale of claim 1 wherein said upper board has an opening therein and a deflectable valve disc adjacent said opening for selectively covering said opening to permit the exhaust of air from said pneumatic volume to permit storage of said platform with minimum volume.

3. The platform of claim 1 wherein said platform is a first platform and there is a second platform adjacent thereto to define a platform structure, each of said platforms having a pneumatic volume therein and said pneumatic volumes being connected together.

4. A portable weight-measuring scale comprising:
a pneumatic platform having an upper board and a lower board with a peripheral skirt therearound and attached to said boards to define a platform pneumatic volume, both said upper and lower boards being substantially circular and said skirt being spirally wound with a flexible filamentary material so that said skirt is restrained to substantially the diameter of said boards so that, when a weight is placed on said upper board, pneumatic pressure in said pneumatic volume is proportional to the weight on said upper board; and
means separate from said platform and connected to said pneumatic volume for measuring the pressure in said pneumatic volume to indicate the weight on the platform.

5. A portable weight-measuring scale comprising:
a pneumatic platform having an upper board and a lower board with a peripheral skirt therearound and attached to both said upper and said lower boards to define a platform pneumatic volume said boards having leafsprings interconnected therebetween, said leafsprings being stressed to substantially support said upper board with respect to said lower board, said upper board being unguided with respect to said lower board and being connected to said lower board only by said leafsprings and said skirt so that, when a weight is placed on said upper board, pneumatic pressure in said pneumatic volume is proportional to the weight on said upper board; and
means separate from said platform and connected to said pneumatic volume for measuring the pressure in said pneumatic volume to indicate the weight on the platform.

6. The portable weight-measuring scale of claim 5 wherein both said upper and said lower boards are substantially circular and wherein said skirt is spirally wound with a flexible filamentary material so that said skirt is restrained to substantially the diameter of said boards.

7. A portable weight-measuring scale comprising:
a pneumatic platform having an upper board and a lower board with a peripheral skirt therearound and attached thereto to define a platform pneumatic volume, both said upper and said lower boards having fold lines thereacross so that said platform can be folded, said platform being arranged so that, when a weight is placed on said upper board, pneumatic pressure in said pneumatic volume is proportional to the weight on said upper board; and
means separate from said platform and connected to said pneumatic volume for measuring the pressure in said pneumatic volume to indicate the weight on the platform.

8. A portable weight-measuring scale comprising:
a pneumatic platform having an upper board with a peripheral skirt therearound and a bottom closure for said skirt to define a platform pneumatic volume so that, when a weight is placed on said upper board, pneumatic pressure in said pneumatic volume is proportional to the weight on said upper board; and
means separate from said platform and connected to said pneumatic volume for measuring the pressure in said pneumatic volume to indicate the weight on the platform, said means for measuring the pressure in said pneumatic volume comprising an upper gage plate and a lower gage plate together with a tension spring connected therebetween and a bellows connected therebetween with said bellows connected to said pneumatic volume so that, when said upper gage plate is supported, the distance the lower gage plate is spaced from said upper gage plate is related to the pressure in said gage bellows and the tension force in said spring.

9. The portable weight-measuring scale of claim 8 further including an indicator to indicate the spacing of said lower gage plate from said upper gage plate.

10. The portable weight-measuring scale of claim 9 wherein said indicator is a flexible tape indicator secured on one end to said upper gage plate, said indicator being calibrated in weight units.

11. The portable weight-measuring scale of claim 10 wherein said bellows is a flexible air-impervious, cylindrically tubular bellows having a spiral filament winding thereon to maintain the bellows diameter.

12. The portable weight-measuring scale of claim 11 wherein said platform includes a lower board, and said skirt is connected to both said upper board and said lower board.

13. The portable weight-measuring scale of claim 12 wherein said boards have leafsprings interconnected therebetween, said leafsprings being stressed to substantially support said upper board with respect to said lower board, said upper board being unguided with respect to said lower board and being connected to said lower board only by said leafsprings and said skirt.

* * * * *